United States Patent [19]

Siebert et al.

[11] Patent Number: 5,080,501
[45] Date of Patent: Jan. 14, 1992

[54] BAYONET HELD BEARING HANGER ASSEMBLY

[75] Inventors: Craig Siebert, Ossining, N.Y.; Martin Scott, Brewster, Mass.

[73] Assignee: Metallized Carbon Corporation, N.Y.

[21] Appl. No.: 680,349

[22] Filed: Apr. 4, 1991

[51] Int. Cl.⁵ ............................................. F16C 35/067
[52] U.S. Cl. ...................................... 384/537; 384/439
[58] Field of Search ............... 384/439, 438, 537, 539, 384/585, 584

[56] References Cited

U.S. PATENT DOCUMENTS

| | | | |
|---|---|---|---|
| 2,631,069 | 3/1953 | Starr | 384/439 |
| 3,808,661 | 5/1974 | Carlsson | 384/439 |
| 4,502,796 | 3/1985 | Wilczewski et al. | 384/439 |
| 4,729,674 | 3/1988 | Siebert et al. | 384/537 X |
| 4,804,277 | 2/1989 | Counoupas | 384/537 |
| 4,854,747 | 8/1989 | Siebert et al. | 384/537 X |

Primary Examiner—Thomas R. Hannon
Attorney, Agent, or Firm—Jordan B. Bierman

[57] ABSTRACT

A hanger bearing assembly comprising a hanger plate having a hole therethrough and adapted to be suspended from a support. A bearing having an outer surface complementary to the hole is located therein. A resilient radially compressible bayonet lock, substantially in the shape of a ring, has a bearing surface which is at least partially in contact with the adjacent surface of either the bearing or the hanger plate. The bayonet lock has portions and at least one extension on the bearing surface extending axially through openings and an extension receiver in the hanger plate; detents are provided on the extensions substantially at right angles thereto circumferentially of the ring and the edges on the detents contact the other of the bearing or hanger plate, whereby radially compression of said bayonet lock permits insertion of the portions into the slots and the extension into the extension receiver, and release of the bayonet lock cause the edges to bear against the other side and releasably retain the bearing in contact with the hanger plate.

14 Claims, 1 Drawing Sheet

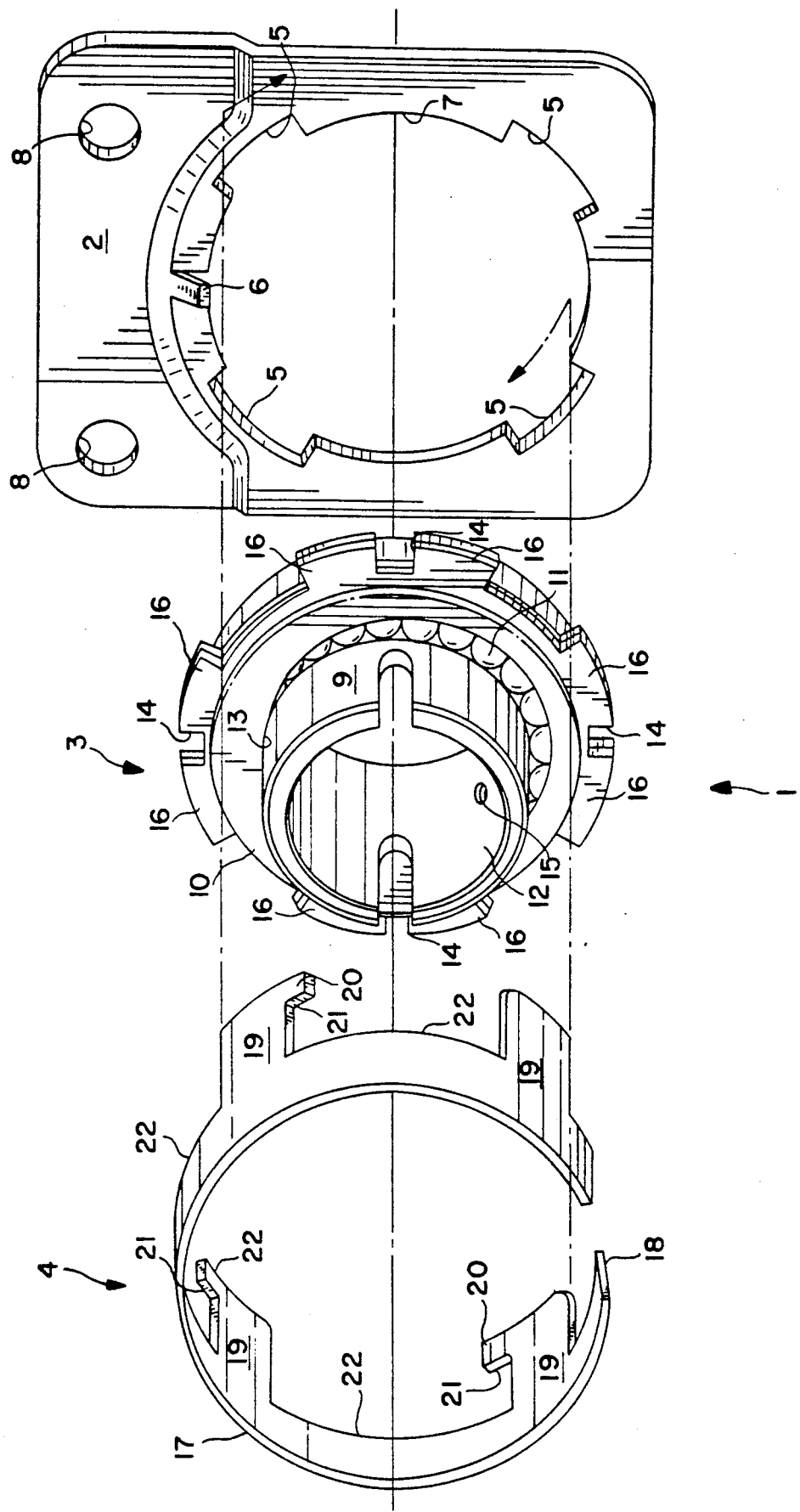

BAYONET HELD BEARING HANGER ASSEMBLY

The present invention is directed to bearing hanger assemblies, particularly such an assembly which is capable of easy and quick installation and dismounting.

BACKGROUND OF THE INVENTION

There are many applications in industry, particularly in the treatment of gypsum board or plywood sheets, requiring the use of large, high temperature ovens. Such tunnel ovens are as long as 300 feet and as large as 6 feet in diameter. It is not at all unusual to heat these devices to temperatures exceeding 1,000° F.

Since such ovens are provided with a large plurality of driven rollers (which move the board from one end to the other), a correspondingly large number of high temperature bearings are required. Should any substantial number of these bearings fail, it is necessary to shut down the oven, give it some time to cool off, and bring in a large crew of men to change the bearings as quickly as possible. Due to the economics of the shut down, the men cannot wait for the oven to cool completely, but must work with asbestos gloves and protective clothing in order to effectuate the change as quickly as possible.

Therefore, it is desirable to provide a hanger type bearing which can be easily and quickly installed and removed.

BRIEF DESCRIPTION OF THE PRESENT INVENTION

It is, therefore, among the objects of the present invention to provide a hanger assembly for a roller bearing wherein both mounting and dismounting can be effectuated quickly and easily. It is also among the objects of the present invention to achieve the foregoing without the use of special tools.

To achieve these ends, the present invention provides a hanger bearing assembly which comprises a hanger plate having a hole therethrough. The plate is adapted to be suspended from an appropriate support and there is provided a bearing with an outer surface complementary to the hole and located therein. The elements are held together by a bayonet lock which is substantially in the shape of a resilient split ring and which has a bearing surface at least partially in contact with an adjacent surface of either the bearing or the hanger plate.

The lock is equipped with a plurality of portions which extend from the bearing surface axially through openings in the hanger plate. There are detents on the portions substantially at right angles thereto in the circumferential direction of the ring. Edges on the detents contact the other of the bearing or hanger plate. There is also at least one extension which fits snugly into the openings in the hanger plate to prevent rotation of the ring.

To assemble the device, the split ring is pressed radially inwardly to cause its circumference to contract. The portions extending from the bearing surface are inserted in the openings (in which they fit loosely) and the extension is inserted in its complementary opening in which it fits snugly. The radial pressure on the ring is then released and its resilience causes it to spring open and lock the device together.

Thus, the bearing may be secured between the surface of the bayonet lock and the near side of the hanger plate; alternatively, the bearing can be on the opposite side of the hanger plate from the bearing surface and, in that case, is held between the edges of the detents and the side of the hanger plate remote from the bearing surface. Preferably, the bearing surface and the bearing are on the same side of the hanger plate.

The bearing itself has an inner race surrounded by a larger diameter outer race with a plurality of ball bearings between them. The outer race is stationary with respect to the hanger plate, while the inner race is permitted to rotate.

In a preferred form of the device, there is at least one flange extending radially outwardly from the outer race. This flange bears against the hanger plate and is held in that position by either the bearing surface or the detents of the bayonet lock. For best results, a plurality of such flanges are disposed circumferentially on the outer race.

In one embodiment of the invention, adjacent flanges are separated circumferentially from one another to form a key slot. The key itself is located on the hanger plate and, when inserted into the slot, prevents rotation of the outer race. Of course, the locations of the slot and the key can be interchanged; i.e. the key can be located on the outer race and the slot on the hanger plate. However, it is preferred that the slot be on the race and the key on the plate.

As a further improvement, a plurality of slots can be provided. Most preferably, there would be four such slots equadistantly spaced from one another around the race. This would enable the bearing to be located in four positions with respect to the hanger plate. This is useful in the event that an eccentric bearing is used. Such a bearing is not symmetrical and, depending upon the mounting of the hanger plate, it may be necessary to place the bearing in one of several different positions with respect to the hanger plate.

BRIEF DESCRIPTION OF THE DRAWING

In the accompanying drawing, in which like reference characters indicate like parts, the single FIGURE is an exploded view of the bearing assembly of the present invention.

DETAILED DESCRIPTION OF THE INVENTION

Hanger assembly 1 is composed of hanger plate 2, bearing 3, and bayonet lock 4. Plate 2 has a hole 7 therethrough and is provided with openings 5. Key 6 projects toward bearing 3. In order to secure plate 2 to its support, mounts 8 permit bolts to be passed therethrough.

Bearing 3 comprises inner race 9, outer race 10, with ball bearings 11 between the inner and outer races. Due to the eccentricity of the outer race, its side pieces extend closer to inner race 9 at top 13 of bearing 3 than at the bottom thereof. Flanges 16 are disposed around the periphery of outer race 10 and adjacent flanges are separated to form key slots 14. Set screws 15 (one of which is not shown) are provided to bear against the roller shaft (not shown) and fix it with respect to inner race 9.

Bayonet lock 4 comprises ring 17 which is split at space 18 and made of a resilient material. Portions 19 extend from bearing surface 22 of lock 4 through openings between flanges 16 and through openings 5 in hanger 2. Detents 20 are at right angles circumferentially to portions 19 and edges 21 are adapted to bear against either bearing 3 or hanger 2. Extension 23 fits into extension receiver 24, thereby preventing unwanted rotation of ring 17.

Since, in the embodiment shown in the Figure, bearing 3 is not symmetrical, it is desired that top 13 be uppermost. Therefore, if hanger 2 is turned 90° or 180° from the position illustrated, it will be necessary to engage key 6 in the appropriate slot 14 so that top 13 remains uppermost. The appropriate slot 14 is placed on key 6 of hanger 2. Thereafter, ring 17 is radially compressed and portions 19 are passed through the large openings between adjacent flanges 16; this movement is continued until portions 19 have also passed through openings 5 in hanger 2. At the same time, extension 23 passes through extension receiver 24.

Thereafter, ring 17 is released so that detents 20 and edges 21 engage the back of hanger plate 2. This serves to lock the bearing in place in a simple and efficient manner. It is removed by simply radially compressing ring 17 and withdrawing portions 19 and extension 23 from contact with hanger plate 2 and bearing 3. When the device is assembled, bearing surface 22 presses against flanges 16 so that bearing 3 is retained between plate 2 and bearing surface 22.

While only a limited number of specific embodiments of the present invention have been expressly described, it is, nonetheless, to be broadly construed and not to be limited except by the character of the claims appended hereto.

We claim:

1. A hanger bearing assembly comprising a hanger plate having a hole therethrough and adapted to be suspended from a support, a bearing having an outer surface complementary to said hole and located therein, and a radially compressible, resilient bayonet lock, substantially in the shape of a ring, having a bearing surface at least partially in contact with an adjacent surface of one of said bearing or said hanger plate, said bayonet lock having portions on said bearing surface extending in an axial direction through slots in said hanger plate, detents on said portions substantially at right angles thereto in a circumferential direction of said ring, edges on said detents adapted to contact another of said bearing or said hangar plate, said bayonet lock also having at least one extension which extends in an axial direction through a snugly fitting extension receiver in said hangar plate, whereby radial compression of said lock, insertion of said portions into said slots, and said extension into said receiver, and release of said lock cause said edges to bear against said other of said bearing or said plate and thereby to releasably retain said bearing in contact with said hanger plate.

2. The assembly of claim 1 wherein said adjacent surface of said bearing is between said bearing surface and said hanger plate.

3. The assembly of claim 1 wherein said bayonet lock is a split ring spring biased radially outwardly.

4. The assembly of claim 1 wherein said bearing comprises at least one flange extending radially outwardly constituting said adjacent surface.

5. The assembly of claim 4 wherein there is a plurality of said flanges circumferentially disposed around said bearing.

6. The assembly of claim 1 wherein said bearing comprises an inner race, an outer race of larger diameter than said inner race and surrounding said inner race, and a plurality of ball bearings between said inner race and said outer race.

7. The assembly of claim 6 wherein there is a key on one of said plate and said bearing and a key slot on another of said plate or said bearing, said slot adapted to receive said key whereby said outer race is prevented from rotating relative to said plate.

8. The assembly of claim 7 wherein said key is on said plate and said slot is on said outer race.

9. The assembly of claim 8 wherein adjacent said flanges are circumferentially spaced from each other to form said key slot therebetween.

10. The assembly of claim 7 wherein said bearing has a plurality of said keys spaced apart circumferentially.

11. The assembly of claim 7 wherein said bearing has a plurality of said key slots spaced apart circumferentially.

12. The assembly of claim 7 wherein said plate has a plurality of said key slots spaced apart circumferentially.

13. The assembly of claim 7 wherein there are four said slots equally spaced circumferentially.

14. The assembly of claim 7 wherein there are four said keys equally spaced circumferentially.

* * * * *